United States Patent
Legner (10) Patent No.: US 9,217,499 B2
(45) Date of Patent: Dec. 22, 2015

(54) DEVICE FOR ACTUATING A FRICTIONAL CONVERTER LOCK-UP CLUTCH OF A HYDRODYNAMIC TORQUE CONVERTER

(75) Inventor: Juergen Legner, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 80 days.

(21) Appl. No.: 14/130,534

(22) PCT Filed: Jun. 14, 2012

(86) PCT No.: PCT/EP2012/061327
§ 371 (c)(1),
(2), (4) Date: Jan. 2, 2014

(87) PCT Pub. No.: WO2013/010732
PCT Pub. Date: Jan. 24, 2013

(65) Prior Publication Data
US 2014/0151177 A1    Jun. 5, 2014

(30) Foreign Application Priority Data
Jul. 20, 2011 (DE) .......................... 10 2011 079 495

(51) Int. Cl.
*F16H 45/02* (2006.01)
*F16H 61/14* (2006.01)

(52) U.S. Cl.
CPC .............. *F16H 45/02* (2013.01); *F16H 61/143* (2013.01); *F16H 2045/0215* (2013.01)

(58) Field of Classification Search
CPC ................... F16H 2045/021; F16H 2045/0215
See application file for complete search history.

(56) References Cited

U.S. PATENT DOCUMENTS

| | | | |
|---|---|---|---|
| 4,448,293 A | 5/1984 | Maeda | |
| 5,058,716 A * | 10/1991 | Lippe et al. | 192/3.33 |
| 5,086,889 A * | 2/1992 | Nobumoto et al. | 477/62 |
| 7,611,002 B2 | 11/2009 | Gierer et al. | |
| 7,628,261 B2 | 12/2009 | Gierer et al. | |
| 2010/0126016 A1 | 5/2010 | An et al. | |

FOREIGN PATENT DOCUMENTS

| | | |
|---|---|---|
| DE | 37 10 902 A1 | 10/1987 |
| DE | 10 2006 006 179 A1 | 8/2007 |
| DE | 10 2006 006 180 A1 | 8/2007 |
| EP | 0 037 050 A2 | 10/1981 |
| EP | 1 918 082 A2 | 5/2008 |
| EP | 1 998 082 A2 | 12/2008 |

OTHER PUBLICATIONS

German Search Report Corresponding to 10 2011 079 495.6 mailed Mar. 1, 2012.
International Search Report Corresponding to PCT/EP2012/061327 mailed Oct. 4, 2012.
Written Opinion Corresponding to PCT/EP2012/061327 mailed Oct. 4, 2012.
International Preliminary Report on Patentability Corresponding to PCT/EP2012/061327 mailed Oct. 17, 2013.

* cited by examiner

*Primary Examiner* — Richard Lorence
(74) *Attorney, Agent, or Firm* — Davis & Bujold, P.L.L.C.; Michael J. Bujold (57) ABSTRACT

A device for actuating a frictional converter lock-up clutch of a hydrodynamic torque converter. A piston of the lock-up clutch can be acted upon by pressure of a inner chamber of a converter that acts in the engaging direction of the lock-up clutch and by pressure of a piston chamber delimited by the piston that acts in the disengaging direction. At least in the disengaging operating condition of the lock-up clutch, the piston space is connected to the inner chamber of the converter. The inner chamber can be supplied with hydraulic fluid via a first line. Hydraulic fluid can be discharged from the inner chamber via a second line. The piston chamber of the lock-up clutch can be connected to a pressurized zone and to an essentially unpressurized zone. By varying the pressure in the piston chamber, the device can modulate the transmission capacity of the lock-up clutch.

6 Claims, 4 Drawing Sheets

DEVICE FOR ACTUATING A FRICTIONAL CONVERTER LOCK-UP CLUTCH OF A HYDRODYNAMIC TORQUE CONVERTER

This application is a National Stage completion of PCT/EP2012/061327 filed Jun. 14, 2012, which claims priority from German patent application serial no. 10 2011 079 495.6

FIELD OF THE INVENTION

The invention concerns a device for actuating a frictional converter lock-up clutch of a hydrodynamic torque converter.

BACKGROUND OF THE INVENTION

A device for operating a hydrodynamic torque converter of a transmission device and a converter lock-up clutch corresponding to it, are known from DE 10 2006 006 179 A1, by means of which simply designed three-line converters can be operated without compromising driving comfort.

Furthermore, from DE 10 2006 006 180 A1 such a device is known, by means of which starting devices in the form of both two-line and three-line converters and lock-up clutches corresponding thereto can be operated, and which at least partially comprise a system-group-independent, standardized assembly.

Piston chambers of converter lock-up clutches associated with three-line converters are designed as closed pressure chambers with only one connection, both in the open and in the closed operating condition of the converter lock-up clutch. Accordingly these converter lock-up clutches also known as closed 3-line converter lock-up clutches as opposed to open 3-line converter lock-up clutches, in which the piston chambers of the converter lock-up clutches in the open operating condition of the converter lock-up clutches are in each case connected to a converter's inner chamber of the respectively associated torque converter, are characterized by greater seal complexity and thus higher manufacturing costs.

EP 1 918 082 A2 describes a device for actuating a frictional converter lock-up clutch of a hydrodynamic torque converter, designed as an open 3-line converter lock-up clutch, in which a piston of the converter lock-up clutch can be acted upon by a pressure of a converter's inner chamber that acts in the closing direction of the converter lock-up clutch and by a pressure of a piston chamber delimited by the piston that acts in the opening direction. At least in the open operating condition of the converter lock-up clutch the piston chamber is connected to the inner chamber of the converter, so the converter lock-up clutch is in the form of an inexpensively and simply designed open 3-line converter lock-up clutch. The inner chamber of the converter can be pressurized with hydraulic fluid via a first line. Hydraulic fluid can be discharged from the inner chamber of the converter via a second line. In addition the piston chamber of the converter lock-up clutch can be connected to a pressurized zone and to an essentially unpressurized zone.

For this purpose a control valve device is provided, by means of which in a first switching position the piston chamber of the converter lock-up clutch can be coupled directly to the pressure side of a hydraulic pump. The inner chamber of the converter is acted upon by a pressure set by a pressure-limiting valve positioned downstream from the pressure side of the hydraulic pump. Downstream from a return line of the hydrodynamic torque converter a further pressure-limiting valve is provided in the second line, by means of which a minimum pressure can be set in the converter's inner chamber of the hydrodynamic torque converter in order to avoid cavitation in the converter's inner chamber. In the first switching position of the valve device that supplies pressure to the piston space of the converter lock-up clutch, the pressure-limiting valve of the second line of the hydrodynamic torque converter is vented toward an unpressurized zone of the device.

In a second switching position of valve device the piston chamber of the converter lock-up clutch is vented by way of the valve device toward the unpressurized zone, so that when the valve device is switched to its second position the pressure in the piston chamber of the converter lock-up clutch falls abruptly to the pressure level of the unpressurized zone, which is usually essentially equal to zero or which corresponds to an ambient pressure around the device. At the same time, in a second switching position of the valve device the pressure-limiting valve in the second line is acted upon via the valve device by the pressure on the pressure side of the hydraulic pump as a pilot pressure.

Thus, in the second switching position of the valve device the pressure in the piston chamber falls abruptly, essentially to zero, and owing to the pressure acting in the inner chamber of the converter, which corresponds to the arithmetical mean of the inlet pressure and the outlet pressure of the hydrodynamic converter lock-up clutch set by the pressure-limiting valve, the converter lock-up clutch is changed abruptly to its closed operating condition in which a torque that depends on the actuating pressure effective in the converter's inner chamber can be transmitted by the converter lock-up clutch.

Thus the transmission capacity of the converter lock-up clutch also increases abruptly, but this impairs the driving comfort to an undesired extent. In addition the value of the transmission capacity of the converter lock-up clutch is abruptly increased by a further amount due to the application of the pressure on the pressure side of the hydraulic pump to the pressure-limiting valve in the second line, since in the second switching position of the control valve device the pilot pressure of the pressure side of the hydraulic pump additionally applied to the pressure-limiting valve in the second line leads to an increase of the counter-pressure in the converter upstream from the pressure-limiting valve in the second line, which increases the pressure in the converter's inner chamber that acts on the piston of the converter lock-up clutch in the closing direction.

SUMMARY OF THE INVENTION

Accordingly, the purpose of the present invention is to provide a device for actuating a frictional converter lock-up clutch of the hydrodynamic torque converter, by means of which a frictional converter lock-up clutch can be actuated in a manner that ensures a high level of driving comfort.

In the device according to the invention for actuating a frictional converter lock-up clutch of a hydrodynamic torque converter, a piston of the converter lock-up clutch can be acted upon by a pressure of a converter's inner chamber that acts in the closing direction of the converter lock-up clutch and by a pressure of a piston chamber delimited by the piston that acts in the opening direction. At least in the open operating condition of the converter lock-up clutch the piston chamber is connected to the converter's inner chamber, whereas the converter's inner chamber can be pressurized with hydraulic fluid via a first line and hydraulic fluid can be discharged from the converter's inner chamber via a second line. In addition the piston chamber of the converter lock-up clutch can be connected to a pressurized zone and to an essentially unpressurized zone.

Since a device is provided by means of which the transmission capacity of the converter lock-up clutch can be modulated by varying the pressure in the piston chamber, shifting processes of the frictional converter lock-up clutch between an open operating condition of the converter lock-up clutch toward a closed operating condition thereof can be carried out with improved driving comfort compared with the systems known from the prior art.

In this context the term modulated transmission capacity is understood to mean an at least transiently continuous variation of the transmission capacity of the converter lock-up clutch, starting from a fully open operating condition of the converter lock-up clutch in which it can transmit essentially no torque, in the direction toward a fully closed operating condition in which a maximum torque value determined by design can be transmitted by the converter lock-up clutch.

By comparison with systems known from the prior art, with which a torque build-up during a closing process of the converter lock-up clutch cannot be influenced, with the device according to the invention 'hard' shifting processes of the converter lock-up clutch with high dynamic torques, such as those that cannot be transmitted to the desired extent with the torque capacity of a converter lock-up clutch having one or more friction surfaces, are avoided.

In an advantageous embodiment of the device according to the invention the device comprises a control valve device arranged between the pressurized zone and the piston chamber of the converter lock-up clutch and between the unpressurized zone and the piston chamber, a throttle device arranged between the control valve device and the unpressurized zone, and a pressure medium reservoir provided between the control valve device and the piston chamber, so that when the converter lock-up clutch is closed the piston chamber is cut off from the inner chamber of the converter and in the first switching position of the control valve device it is connected to the pressurized zone, while in a second switching position it is connected via the throttle device to the unpressurized zone.

In this embodiment, in the open operating condition of the converter lock-up clutch, by virtue of the control valve connection of the piston chamber to the pressurized zone the pressure in the piston chamber can be set higher than the pressure in the converter's inner chamber and thus, in a simple manner, the converter lock-up clutch can be kept in its open operating condition. When it is required to change the converter lock-up clutch to its closed operating condition, the control valve device is moved from the first switching position to its second switching position and the piston chamber is thereby connected via the control valve device and via the throttle device to the unpressurized zone, so that the pressure in the piston chamber is vented toward the unpressurized zone whose pressure level is essentially zero or can be at the level of a pre-filling pressure. At the same time the pressure medium reservoir, which in the first switching position of the control valve device is completely full, is discharged toward the unpressurized zone by releasing the hydraulic fluid stored in the pressure medium reservoir via the control valve device and the throttle device. The pressure existing in the area of the throttle device and also in the area of the piston chamber because of the discharging of the pressure medium reservoir toward the unpressurized zone, leads to a slow decrease of the pressure in the piston chamber, as is required for the modulation of the transmission capacity of the converter lock-up clutch.

The slow decrease of the pressure in the piston chamber of the converter lock-up clutch, in combination with the pressure present in the inner chamber of the converter acting in the closing direction of the converter lock-up clutch, result in an also slow increase of the transmission capacity of the converter lock-up clutch, whereby a torque-modulated engagement of the converter lock-up clutch is achieved.

In an embodiment of the device according to the invention that can be produced inexpensively and operated simply, the pressure medium reservoir is in the form of a piston-cylinder unit whose piston element is acted upon by a spring force of a spring device in opposition to a pressure force acting on a face of the piston element, the pressure force being equivalent to a pressure present in the piston chamber.

If the pressure medium reservoir is integrated in the piston chamber and if the volume of the pressure medium reservoir varies as a function of a defined elasticity of the piston of the converter lock-up clutch and of a pressure present in the piston chamber, then a torque-modulated engagement of the converter lock-up clutch can be achieved in a space-saving manner and with little actuation effort.

In a further advantageous embodiment of the device according to the invention, the device comprises a regulating valve device arranged between the pressurized zone and the piston chamber and between the unpressurized zone and the piston chamber, such that by way of the regulating valve device the piston chamber can be brought into functional connection with the pressurized zone and with the unpressurized zone.

In a simple manner this makes it possible, when the converter lock-up clutch is in the open operating condition, to act upon the piston chamber via the regulating valve with a regulated set pressure which keeps the converter lock-up clutch in its open operating condition. In addition, by means of the regulating valve the pressure in the piston chamber can be adjusted so as to bring the piston chamber, via the regulating valve, into functional connection with the unpressurized zone. During this the pressure in the piston chamber can be reduced slowly in a controlled manner so as to achieve a torque-modulated engagement of the converter lock-up clutch as required for high driving comfort.

If the device comprises a throttle device that connects the piston chamber and the converter's inner chamber, the regulating valve can be designed with a positive overlap and the torque-modulated engagement of the converter lock-up clutch can then be carried out with a low leakage volume flow.

In the present case a regulating valve device designed with positive overlap is understood to mean a valve device in which, over the displacement path of a valve slide between a first end position toward a second end position, a dead path has to be passed through during which all connections to the valve device are closed. In contrast, a regulating valve device with negative overlap is designed so that in a defined switching position of a valve slide all the channels are connected to one another. Thus, by means of a regulating valve device with negative overlap the pressure in the piston chamber of the converter lock-up clutch can be reduced to the desired extent without the throttle device provided for connecting the piston chamber and the inner chamber of the converter. For this, the pressurized zone and the unpressurized zone can be connected, by way of the regulating valve device designed with negative overlap, to the piston chamber at the same time for the torque modulation of the converter lock-up clutch during the engagement of the converter lock-up clutch, to the extent necessary for that purpose.

If the pressure of the pressurized zone is governed by a sequence valve or pressure-limiting valve provided downstream from a source of pressure medium, preferably a hydraulic pump, influence upon the pressure upstream from the follow-up valve or downstream from the pressure medium source is avoided in a simple manner by acting upon the piston chamber with hydraulic fluid from the pressurized zone.

Thus for example, the supply of pressure medium to a primary pressure circuit of a hydraulic system of a transmission device connected directly to the pressure medium source, by means of which shifting elements such as clutches and/or brakes are actuated in order to obtain various gear ratios, is independent of the supply to the converter lock-up clutch.

In a further advantageous embodiment of the device according to the invention, downstream from the sequence or pressure-limiting valve, a further sequence or pressure-limiting valve is provided, by means of which, preferably, a lubrication pressure circuit of a transmission device can be connected to the pressurized zone above a defined pressure level upstream from the further sequence valve. In this way the pressure in the pressurized zone can be limited in a simple manner to a predefined pressure level that does not impair the functional mode of the converter lock-up clutch and also that of the hydrodynamic torque converter, whereas if the pressure level in the area of the further sequence valve is exceeded, the hydraulic fluid volume discharged can be used to supply a lubrication pressure circuit.

If a throttle device is provided between the pressurized zone and the inner chamber of the converter, this ensures in a simple manner that in the open operating condition of the converter lock-up clutch the pressure effective in the converter's inner chamber is lower than the pressure of the pressurized zone acting in the piston chamber of the converter lock-up clutch, so that the converter lock-up clutch can be kept securely in its open operating condition.

In a further advantageous embodiment of the device according to the invention an additional sequence valve is provided downstream from the converter's inner chamber, by way of which, above a defined pressure level upstream from the additional sequence valve, a cooling device can preferably be supplied with hydraulic fluid. In this way, by virtue of the additional sequence valve a defined pressure can be set in the converter's inner chamber, thanks to which cavitation in the torque converter can be avoided.

If the lubrication pressure circuit is arranged downstream from the cooling device and the pressurized zone can be brought into functional connection with the lubrication pressure circuit downstream and upstream from the lubrication pressure circuit by means of the sequence valve, then the pressure in the converter's inner chamber can be limited and at the same time the minimum pressure value required in order to avoid cavitation in the torque converter can be maintained.

The characteristics indicated in the example embodiments of the device according to the invention described below, whether considered in isolation or in any desired combination with one another, are in each case suitable as further developments of the object according to the invention. In relation to such further development of the object of the invention the respective combinations of characteristics have no restrictive force but are presented only as examples.

BRIEF DESCRIPTION OF THE DRAWINGS

Further advantages and advantageous embodiments of the device according to the invention emerge from the example embodiments whose principle is described below with reference to the drawing. For the sake of clarity, in the description of the various example embodiments components having the same structure and function are denoted by the same indexes.

The drawing shows.

DETAILED DESCRIPTION OF THE PREFERRED EMBODIMENTS

Figure 1:
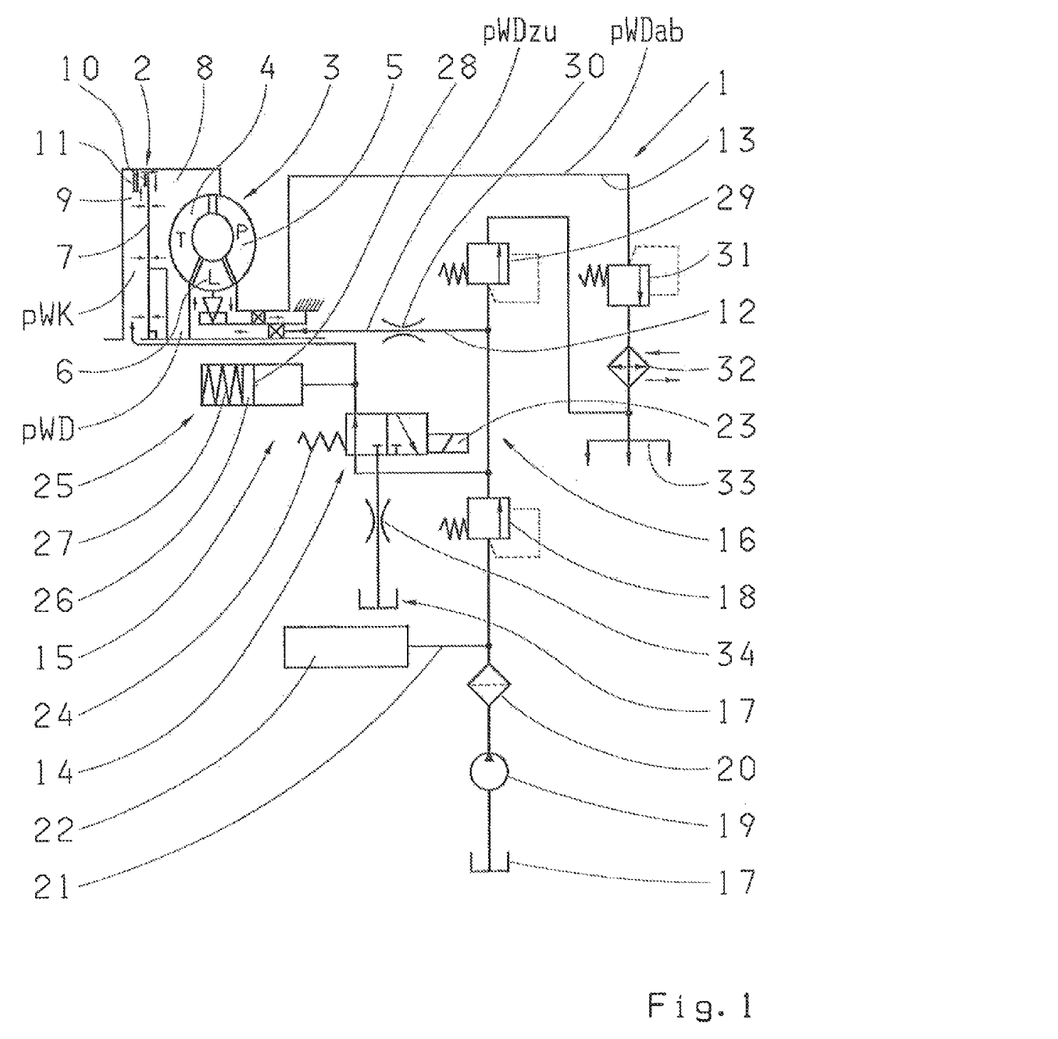
FIG. 1: A simplified shifting scheme of a first embodiment of the device according to the invention when the converter lock-up clutch is open.

FIG. 1: shows a device 1 for actuating a frictional converter lock-up clutch 2 of a hydrodynamic torque converter 3. In a manner known per se the torque converter 3 is made with a turbine wheel 4, a pump impeller wheel 5 and a guide wheel 6. Moreover, the converter lock-up clutch 2 is formed with a piston 7 which is designed to move axially relative to the turbine wheel 4 and an inner chamber 8 of the converter. An axial position of the piston 7 is produced as a function of a pressure pWK in a piston chamber 9 delimited by the piston 7, which pressure is applied on the piston 7 and acts in the opening direction of the converter lock-up clutch 2, and of a pressure pWD present in the converter's inner chamber 8, which acts on the piston 7 in the closing direction of the converter lock-up clutch 2. In this case the pressure pWD acting on the piston 7 from the converter's inner chamber 8 corresponds to the arithmetical mean of an inlet pressure pWDzu of the hydrodynamic torque converter 3 and an outlet pressure pWDab of the hydrodynamic torque converter 3.

When the converter lock-up clutch 2 is closed the piston 7 comes into contact, with a friction lining 10 on its side facing away from the turbine wheel, against another friction lining 11 fixed firmly onto the pump wheel 5 so that in the closed operating condition of the converter lock-up clutch 2 the turbine wheel 4, which is connected to the piston 7 in a rotationally fixed manner, is connected rotationally fixed to the pump wheel. In contrast, when the converter lock-up clutch 2 is open the piston 7 is not in contact with the friction lining 11 of the pump wheel 5.

In this case the friction linings 10 and 11 are not made with grooves so that when the converter lock-up clutch 2 is open the piston chamber 9 is connected in the area between the friction linings 10 and 11 to the converter's inner chamber 8 and when the converter lock-up clutch 2 is closed it is cut off from the converter's inner chamber 8.

In the present case the inner chamber 8 of the converter can be fed by way of a first line 12 with hydraulic fluid at the inlet pressure pWDzu. In addition, by way of a second line 13 hydraulic fluid can be discharged from the converter's inner chamber 8 at the outlet pressure pWDab. In this case the piston chamber 9 can be connected by way of a control valve device 14 of a device 15 to a pressurized zone 16 and to an essentially unpressurized zone 17 or tank. In this case the pressure of the pressurized zone 16 is governed by a sequence 18 or pressure-limiting valve, which is positioned downstream from a pressure medium source 19, here in the form of a hydraulic pump. In this case the hydraulic pump 19 is followed downstream by a filter element 20 in the area of which the hydraulic fluid delivered by the hydraulic pump 19 is filtered.

Downstream from the filter element 20 and upstream from the pressure-limiting valve 18 a line 21 branches off, via which a primary pressure circuit 22 of a transmission device of a vehicle drive-train of a telehandler, a wheel loader or the like, made with the torque converter 3 constituting a starting element, is supplied by the hydraulic pump 19 with high pressure, preferably 16 to 20 bar. By way of the primary pressure circuit 22 shifting elements of the transmission device (not shown in the drawing), for example in the form of clutches and/or brakes, can be acted upon with the actuating pressures required in order to obtain various gear ratios or gear ratio ranges within which a gear ratio of the transmission device can in each case be adjusted continuously.

In the first switching position of the control valve device 14 shown in FIG. 1, the pressure of the pressurized zone 16 is passed on via the control valve device 14 or converter lock-up clutch control valve in the direction of the piston chamber 9 of the converter lock-up clutch 2. The control valve device 14 or a digital magnet 23 is not energized and the control valve device 14 is held in its first switching position by a spring mechanism 24. Between the control valve device 14, in this case in the form of a 3/2-way valve, and the piston chamber 9 there is arranged a pressure medium reservoir 25 of the device 15, which is in the form of a piston-cylinder unit. A piston element 26 of this pressure medium reservoir 25 is acted upon by the spring force of a spring mechanism 27 in opposition to a pressure force applied on a face 28 of the piston element 26, the pressure force being in each case equivalent to a pressure present in the piston chamber 9. In the first shifting position of the control valve device 14 the pressure medium reservoir 25 is completely filled because of the pressure in the pressurized zone 16 that acts upon the face 28 of the pressure element 26.

Downstream from the pressure-limiting valve 18 is provided a further sequence valve 29 or pressure-limiting valve, by which the pressure in the pressurized zone 16 is limited. The pressure-limiting valve 29 constitutes a converter safety valve by means of which inadmissibly high pressure values in the converter's inner chamber 8 are avoided in a simple manner. Upstream from the further pressure-limiting valve 29 the first line 12 branches off toward the converter's inner chamber 8, and the first line 12 is provided with a throttle device 30 in the area of which a defined pressure drop is produced. The throttle device 30 ensures that the pressure in the converter's inner chamber 8 or the pressure pWD acting on the piston 7 in its closing direction is lower than the pressure pWK of the piston chamber 9 that acts on the piston 7 when the control valve device 14 is in its first switching position as shown in FIG. 1. This ensures that in the first switching position of the control valve device 14 the converter lock-up clutch 2 is always in its open operating condition.

The sum of the hydraulic fluid volume flows passing by way of the piston chamber 9 and the first line 12 into the inner chamber 8 of the converter is passed via the second line 13 out of the converter's inner chamber 8 in the direction toward an additional sequence valve 31 or an additional pressure-limiting valve, which constitutes a so-termed converter counter-pressure valve. This additional sequence valve 31 ensures that a pressure in the converter's inner chamber 8 does not fall below a defined pressure level below which damaging cavitation takes place in the converter's inner chamber 8 of the torque converter 3. In addition the additional sequence valve 31 ensures that a constant pressure situation exists in the converter's inner chamber, which simplifies the actuation of the converter lock-up clutch 2.

Above a defined pressure level of the additional pressure-limiting valve 31 the additional pressure-limiting valve 31 opens and the hydraulic fluid volume flowing through the additional pressure-limiting valve 31 passes through a cooling device 32 arranged downstream thereof. In turn, downstream from the cooling device 32 a lubrication pressure circuit 33 of the transmission device is provided. If the pressure in the pressurized zone 16 increases to inadmissibly high values, the further pressure-limiting valve 29 opens and the hydraulic fluid volume flow passing through it is led downstream from the cooling device 32 and upstream from the lubrication pressure circuit 33, in the direction of the lubrication pressure circuit 33.

Figure 2:
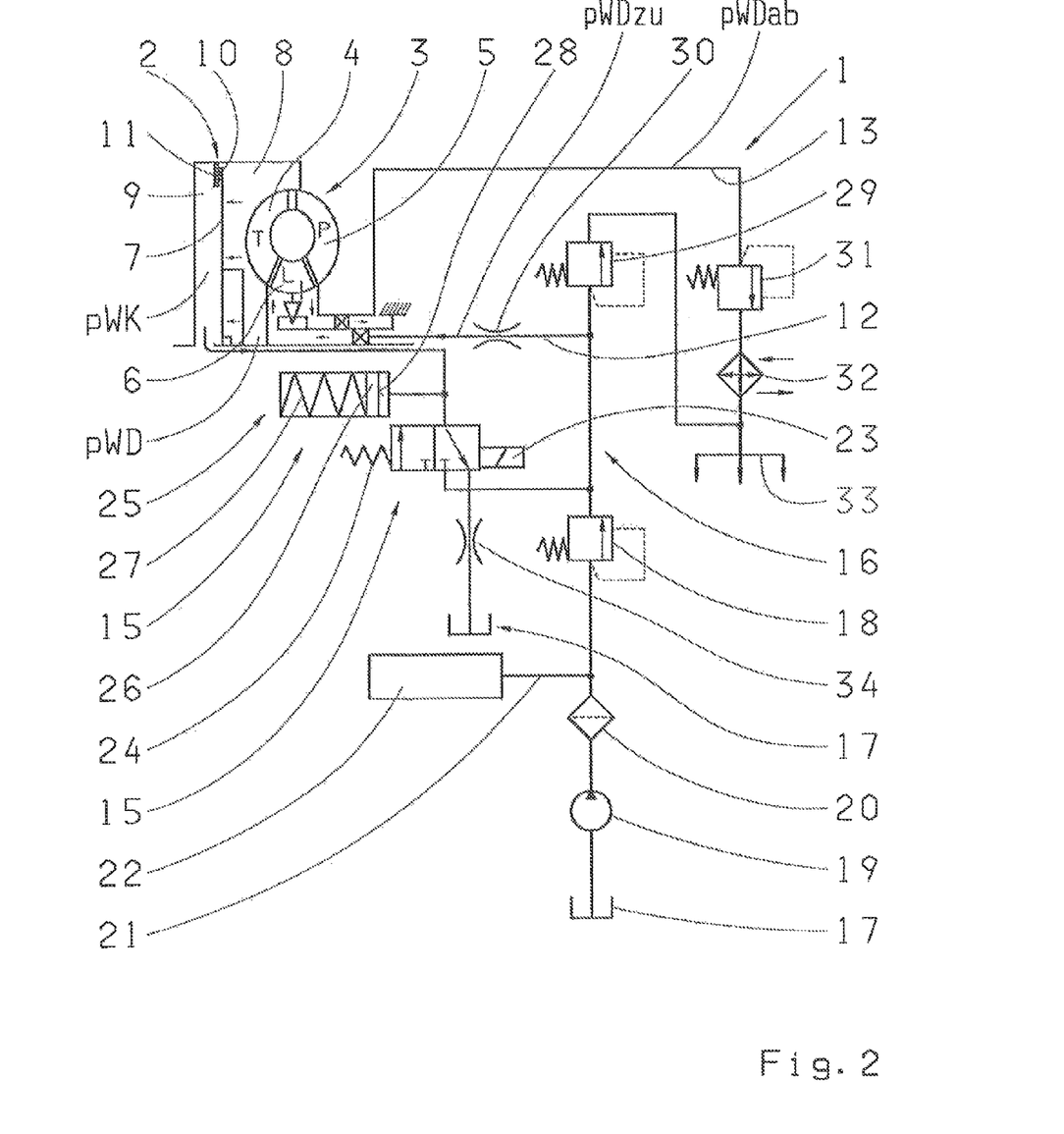
FIG. 2: A device as in FIG. 1 when the converter lock-up clutch is closed.

When it becomes necessary to close the converter lock-up clutch 2, the digital magnet 23 of the control valve device 14 is appropriately energized and the control valve device 14 is moved in opposition to the spring force of the spring mechanism 24 to its second switching position shown in FIG. 2, in which the connection between the piston chamber 9 and the pressurized zone 16 in the area of the control valve device 14 is blocked and, by way of the control valve device 14, the piston chamber 9 is connected via a throttle device 34 to the essentially unpressurized zone 17. In this operating condition of the device 1, owing to the decreasing pressure pWK in the piston chamber 9 the inner chamber 8 of the converter is now only still supplied with hydraulic fluid via the first line 12 from the pressurized zone 16 and at the same time hydraulic fluid is discharged from the converter's inner chamber 8 via the second line 13.

This results from the fact that owing to the connection of the piston chamber 9 to the unpressurized zone 17 the pressure in the piston chamber 9 first falls for a short time and the piston 7 is pressed by the pressure pWD acting in the converter's inner chamber 8 against the friction lining 11 and the piston chamber 9 is cut off from the converter's inner chamber 8. The piston chamber 9 is then not supplied with hydraulic fluid either from the pressurized zone 16 via the control valve device 14 or from the converter's inner chamber 8. To prevent an abrupt fall of the pressure pWK in the piston chamber 9 and avoid an abrupt increase of the transmission capacity of the converter lock-up clutch 2, the spring force of the spring mechanism 27 of the pressure medium reservoir 25 is in the present case designed such that the pressure medium reservoir 25 feeds the stored pressure medium or hydraulic fluid into the area between the control valve device 14 and the piston chamber 9.

In accordance with the spring characteristic of the spring mechanism 27 and the face area 28 of the piston element 26 of the pressure medium reservoir 25 which constitutes a modulation reservoir, due to the feeding of hydraulic fluid from the pressure medium reservoir in combination with the throttle device 34 the pressure pWK in the piston chamber 9 falls slowly. The hydraulic fluid stored in the pressure medium reservoir 25 flows through the throttle device 34 toward the unpressurized zone 17, so that as a function of time a defined pressure variation of the pressure pWK in the piston chamber 9 is produced and the torque that can be transmitted by the converter lock-up clutch increases slowly with time. Thus, an engagement of the converter lock-up clutch 2 which is torque-modulated to the desired extent is achieved.

Figure 3:
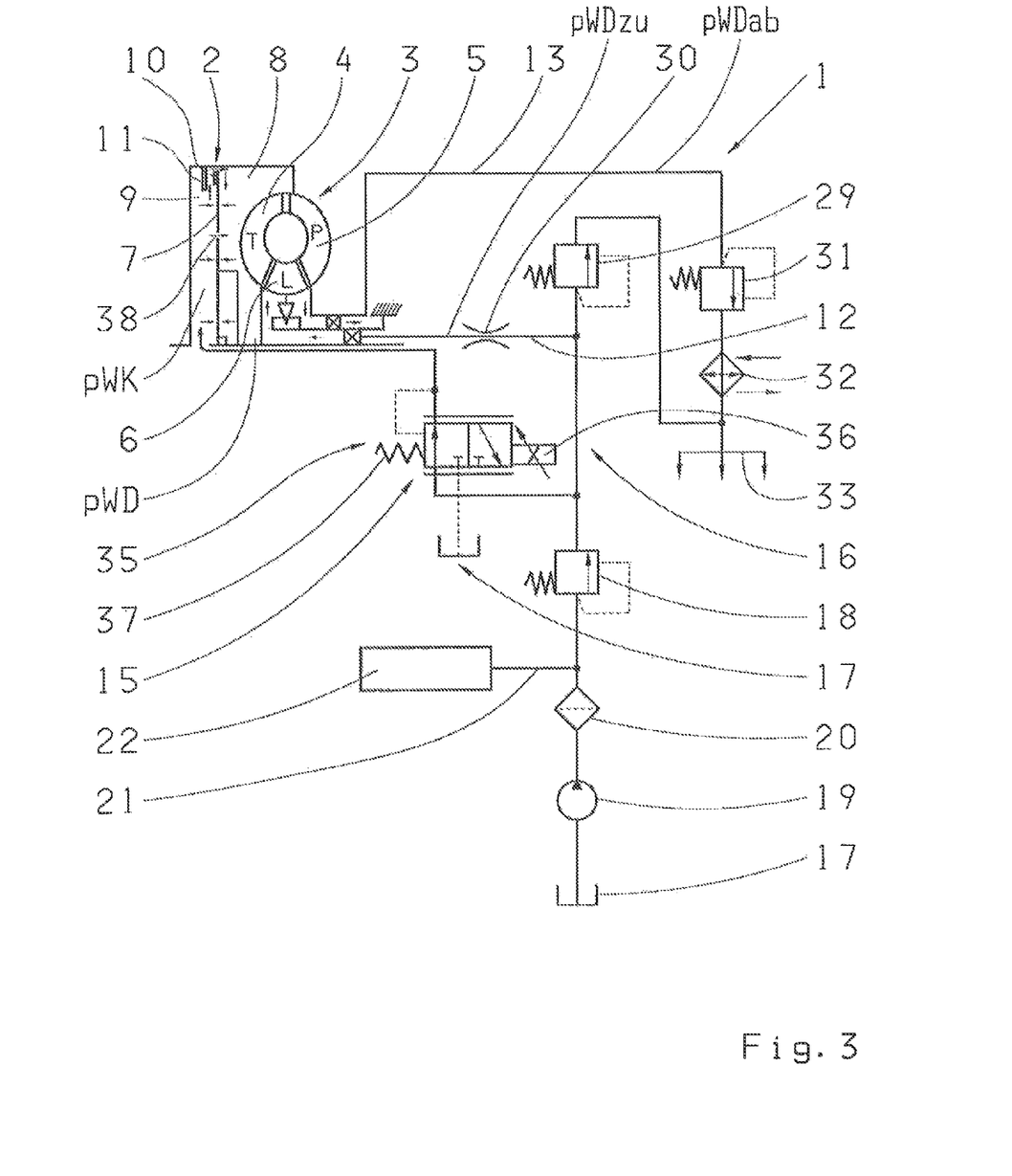
FIG. 3: A representation corresponding to FIG. 1, showing a second embodiment of the device according to the invention when the converter lock-up clutch is open.

FIG. 3 shows a second example embodiment of the device 1 in a representation analogous to FIG. 1, such that the device 1 of FIG. 3 differs from the first example embodiment according to FIGS. 1 and 2 essentially only in the area of the device 15. For that reason, in the description below only the differences between the two examples embodiments will be dealt with, whereas regarding the further functional mode of the device 1 in FIG. 3 reference should be made to the previous description.

In the device 1 according to FIG. 3, instead of the control valve device 14 the device 15 comprises a regulating valve device 35 in the form of a pressure-reducing valve, which is provided between the pressurized zone 16 and the piston chamber 9 and between the unpressurized zone 17 and the piston chamber 9. The regulating valve device 35 is made with a proportional magnet 36 and a spring mechanism 37, such that in the first end position of the regulating valve device 35 shown in FIG. 3, the piston chamber 9 is fully connected to the pressurized zone 16 and the converter lock-up clutch 2 is in its fully open operating condition.

In this case the piston 7 of the converter lock-up clutch 2 is formed with a throttle device 38 in the piston chamber 9 that connects to the converter's inner chamber 8, since the regulating valve device 35 is designed with positive overlap. If the regulating valve device is designed with negative overlap, the throttle device in the area of the piston of the converter lock-up clutch is not necessary for a torque-modulated engagement of the converter lock-up clutch.

Since when the converter lock-up clutch 2 is open the pressure pWK in the piston chamber 9 is higher than the pressure pWD in the inner chamber 8 of the converter, the converter's inner chamber 8 is supplied with hydraulic fluid both by way of the first line 12 and also, starting from the piston chamber 9, via the friction linings 10 and 11 and via the throttle device 38.

Figure 4:
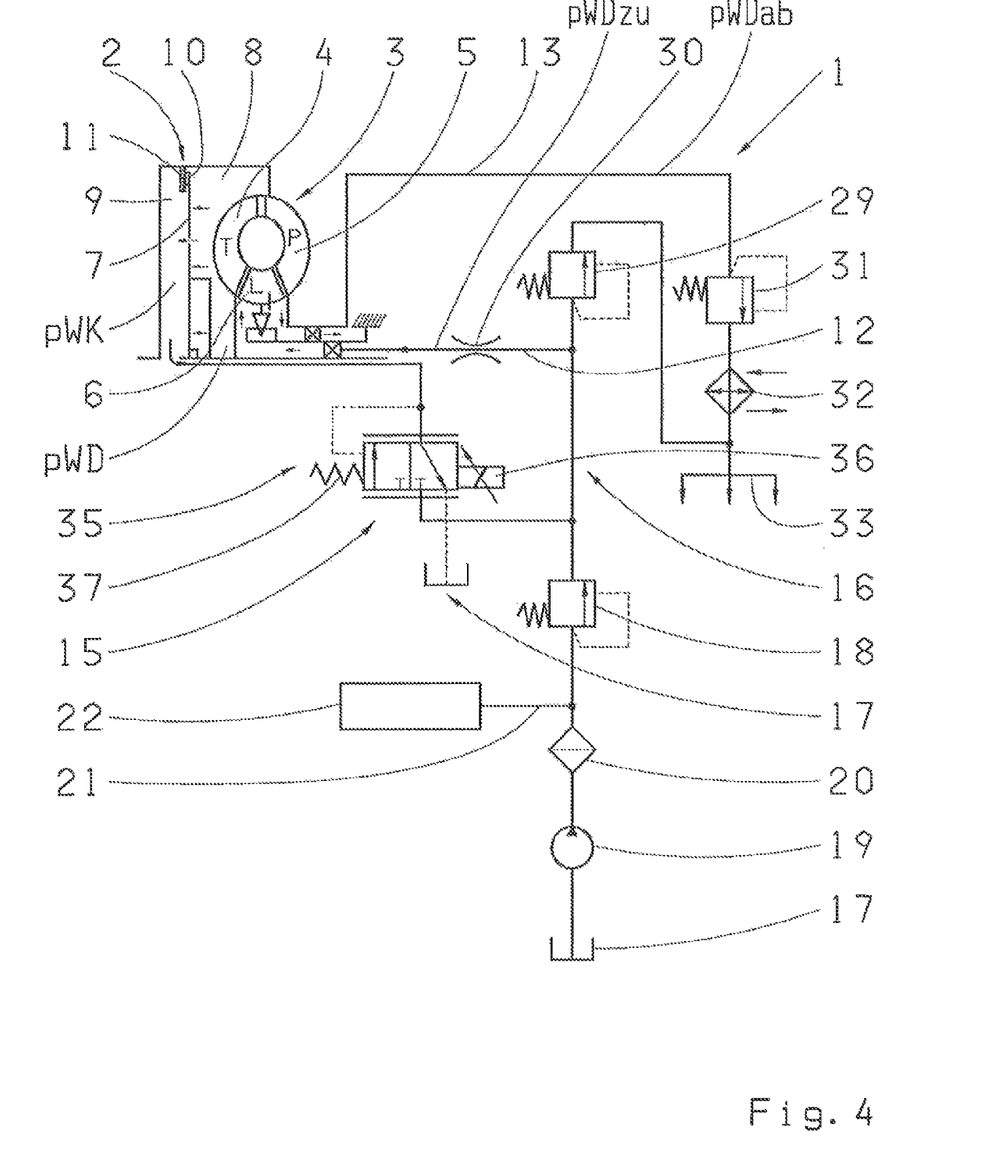
FIG. 4: The device of FIG. 3 when the converter lock-up clutch is closed.

When a corresponding demand to close the converter lock-up clutch 2 occurs, the regulating valve device 35 or the proportional magnet 36 is energized in such manner that the piston chamber 9 is connected for a short time to the unpressurized zone 17 via the regulating valve device 35. Thereby, the piston 7 with its friction lining 10 quickly comes into contact with the friction lining 11, whereby the volume flow of hydraulic fluid from the piston chamber 9 between the friction linings 10 and 11 toward the converter's inner chamber 8 is interrupted.

To avoid an abrupt increase of the transmission capacity of the converter lock-up clutch 2, the piston chamber 9 is acted upon in a controlled manner via the regulating valve device 35 with a pressure from the pressurized zone 16. The oil flow through the throttle device 38 of the piston 7 is used to lower the pressure pWK in the piston chamber 9 slowly and to bring about a torque-modulated engagement of the converter lock-up clutch 2 starting from its open operating condition toward its fully closed operating condition, while being able to ensure a high level of driving comfort.

INDEXES

1 Device
2 Converter lock-up clutch
3 Hydrodynamic torque converter
4 Turbine wheel
5 Pump impeller wheel
6 Guide wheel
7 Piston
8 Inner chamber of the converter
9 Piston chamber
10 Friction lining
11 Friction lining
12 First line
13 Second line
14 Control valve device
15 Device
16 Pressurized zone
17 Unpressurized zone, tank
18 Sequence valve, pressure-limiting valve
19 Pressure medium source, hydraulic pump
20 Filter element
21 Line
22 Primary pressure circuit
23 Digital magnet
24 Spring mechanism
25 Pressure medium reservoir
26 Piston element
27 Spring mechanism
28 Face (of piston element (26))
29 Sequence valve, further pressure-limiting valve
30 Throttle device
31 Additional sequence valve, pressure-limiting valve
32 Cooling device
33 Lubricant circuit
34 Throttle device
35 Regulating valve device
36 Proportional magnet
37 Spring mechanism
38 Throttle device
pWK Pressure in the piston chamber
pWD Effective pressure in the inner chamber of the converter
pWDzu Inlet pressure of the torque converter
pWDab Outlet pressure of the torque converter

The invention claimed is:

1. A device (1) for actuating a frictional converter lock-up clutch (2) of a hydrodynamic torque converter (3),
wherein a piston (7) of the converter lock-up clutch (2) is acted upon by a first pressure (pWD) of an inner chamber (8) of the converter that acts in an engaging direction of the converter lock-up clutch (2) and by a second pressure (pWK) of a piston chamber (9), delimited by the piston (7), that acts in an disengaging direction,
at least when the converter lock-up clutch (2) is in a disengaged operating condition, the piston chamber (9) is connected to the inner chamber (8) of the converter, and the inner chamber (8) of the converter is fed with hydraulic fluid, via a first line (12), and hydraulic fluid is discharged from the inner chamber (8) of the converter, via a second line (13),
the piston chamber (9) of the converter lock-up clutch (2) is connectable to a pressurized zone (16) and to an essentially unpressurized zone (17),
an apparatus (15) is provided by which a transmission capacity, of the converter lock-up clutch (2), is modulated by varying the second pressure (pWK) in the piston chamber (9), the apparatus (15) comprises a regulating valve device (35) arranged between the pressurized zone (16) and the piston chamber (9) and between the unpressurized zone (17) and the piston chamber (9) such that the piston chamber (9) is brought into functional connection, by way of the regulating valve device (35), with the pressurized zone (16) and with the unpressurized zone (17), and the apparatus (15) comprises a throttle device (38) which connects the piston chamber (9) and the inner chamber (8) of the converter, and
a further throttle device (30) is provided between the pressurized zone (16) and the inner chamber (8) of the converter.

2. The device according to claim 1, wherein a pressure of the pressurized zone (16) is governed by a sequence valve (18) located downstream from a pressure medium source (19).

3. The device according to claim 2, wherein a primary pressure circuit (22) of a transmission device is supplied with hydraulic fluid from the pressure medium source (19), and the primary pressure circuit (22) is located downstream from the pressure medium source (19) and upstream from the sequence valve (18).

4. The device according to claim 2, wherein a further sequence valve (29) is provided, downstream from the sequence valve (18), by which a lubrication pressure circuit (33) is connectable to the pressurized zone (16) above a defined pressure level upstream from the further sequence valve (29).

5. A device (1) for actuating a frictional converter lock-up clutch (2) of a hydrodynamic torque converter (3), wherein a piton (7) of the converter lock-up clutch (2) is acted upon by a first pressure (pWD) of an inner chamber (8) of the converter that acts in an engaging direction of the converter lock-up clutch (2) and by a second pressure (pWK) of a piston chamber (9), delimited by the piston (7), that acts in an disengaging direction, at least when the converter lock-up clutch (2) is in a disengaged operating condition, the piston chamber (9) is connected to the inner chamber (8) of the converter, and the inner chamber (8) of the converter is fed with hydraulic fluid, via a first line (12), and hydraulic fluid is discharged from the inner chamber (8) of the converter, via a second line (13), the piston chamber (9) of the converter lock-up clutch (2) is connectable to a pressurized zone (16) and to an essentially unpressurized zone (17), an apparatus (15) is provided by which a transmission capacity, of the converter lock-up clutch (2), is modulated by varying the second pressure (pWK) in the piston chamber (9), the apparatus (15) comprises a regulating valve device (35) arranged between the pressurized zone (16) and the piston chamber (9) and between the unpressurized zone (17) and the piston chamber (9) such that the piston chamber (9) is brought into functional connection, by way of the regulating valve device (35), with the pressurized zone (16) and with the unpressurized zone (17), and the apparatus (15) comprises a throttle device (38) which connects the piston chamber (9) and the inner chamber (8) of the converter, an additional sequence valve (31) is provided in the second line (13), upstream from the inner chamber (8) of the converter, by which, above a defined pressure level upstream from the additional sequence valve (31), a cooling device (32) is supplied with hydraulic fluid, and a lubrication pressure circuit (33) is arranged downstream from the cooling device (32) and, by a further sequence valve (29), the pressurized zone (16) is brought into functional connection with the lubrication pressure circuit (33) downstream from the cooling device (32) and upstream from the lubrication pressure circuit (33).

6. An actuator (1) for actuating a frictional converter lock-up clutch (2) of a hydrodynamic torque converter (3), a piston (7) of the converter lock-up clutch (2) being biased in an engaging direction of the converter lock-up clutch (2) by a first pressure (pWD) in an inner chamber (8) of the converter, and the piston (7) of the converter lock-up clutch (2) being biased in a disengaging direction of the converter lock-up clutch (2) by a second pressure (pWK) in a piston chamber (9) that is delimited by the piston (7), at least when the converter lock-up clutch (2) is in a disengaged operating condition, the piston chamber (9) being connected to the inner chamber (8) of the converter, the inner chamber (8) of the converter being supplied with hydraulic fluid, via a first line (12), and the hydraulic fluid being discharged from the inner chamber (8), of the converter, via a second line (13), the piston chamber (9) of the converter lock-up clutch (2) being connectable to a pressurized zone (16) and to an essentially unpressurized zone (17), an apparatus (15) comprising a regulating valve device (35) that is arranged between the pressurized zone (16) and the piston chamber (9) and between the unpressurized zone (17) and the piston chamber (9), the regulating valve device (35) being actuatable to functionally connect the piston chamber (9) and either the pressurized zone (16) or the unpressurized zone (17), the apparatus (15) comprises a throttle device (38) which connects the piston chamber (9) and the inner chamber (8) of the converter such that modulation of the apparatus varies the second pressure (pWK) in the piston chamber (9) and adjusts a transmission capacity of the converter lock-up clutch (2), and a further throttle device (30) is provided between the pressurized zone (16) and the inner chamber (8) of the converter.

* * * * *